United States Patent [19]

Kruske et al.

[11] 4,231,793

[45] Nov. 4, 1980

[54] NICKEL-BASE ALLOY

[75] Inventors: Gerhard Kruske, Oberursel; Otto Knotek, Aachen, both of Fed. Rep. of Germany; Erich Lugscheider, Vaals, Netherlands

[73] Assignee: Metallgesellschaft Aktiengesellschaft, Frankfurt am Main, Fed. Rep. of Germany

[21] Appl. No.: 54,519

[22] Filed: Jul. 3, 1979

[30] Foreign Application Priority Data

Jul. 6, 1978 [DE] Fed. Rep. of Germany ....... 2829702

[51] Int. Cl.$^2$ ............................................. C22C 19/05
[52] U.S. Cl. .................................. 75/122; 75/134 F; 75/171; 75/176
[58] Field of Search ..................... 75/122, 134 F, 171, 75/176

[56] References Cited

U.S. PATENT DOCUMENTS 2,744,009  5/1956  Bowne et al. .......................... 75/171

Primary Examiner—R. Dean

Attorney, Agent, or Firm—Sprung, Felfe, Horn, Lynch & Kramer

[57] ABSTRACT

A nickel-base alloy which is resistant to corrosion, abrasion, erosion, cavitation and temperature cycles and possesses a high high-temperature strength, consisting essentially of the following composition in percent by weight:

Carbon: 0.5 to 5
Tungsten: 2 to 15
Chromium: 25 to 55
Boron: 0.5 to 3.5
Phosphorus: 0.5 to 4.5
Silicon: 1 to 5
Iron: 1 to 5
Nickel: balance and meets the following boundary conditions:

(a) percent by weight C=percent by weight $C_1$=percent by weight $C_2$+0.2;
(b) percent by weight W=36×percent by weight $C_1$; and
(c) percent by weight Cr≧17+9×percent by weight $C_2$−4×percent by weight C.

4 Claims, No Drawings

NICKEL-BASE ALLOY

BACKGROUND OF THE INVENTION

1. Field of the Invention

This invention relates to a nickel-base alloy which resists corrosion, abrasion, erosion, cavitation and temperature cycles and possesses a high-temperature strength. In particular, this invention relates to an improved alloy of the type disclosed in corresponding application Ser. No. 828,718 which alloy has the following composition in percent by weight:

Carbon: 0.5 to 5
Tungsten: 2 to 15
Chromium: 25 to 55
Boron: 0.5 to 3.5
Silicon: 1 to 5
Iron: 1 to 5
Nickel: balance and meet the following boundary conditions:

(a) percent by weight C = percent by weight $C_1$ + percent by weight $C_2$ + 0.2;

(b) percent by weight W = 36 × percent by weight $C_1$; and (c) percent by weight Cr ≧ 17 + 9 × percent by weight − 4×

Where:

percent by weight $C_1$ = carbon content required to form carbides with refractory metals (tungsten, molybdenum)

percent by weight $C_2$ = carbon content required to form chromium carbide 0.2 = a constant which is equivalent to the solubility limit of C in the nickel-chromium solid solution.

In particular this invention relates to such an alloy additonally containing phosphorus, e.g., in an amount of 0.5–4.5 weight percent. The alloy has improved processing characteristics.

2. Discussion of the Prior Art

In virtually all fields of industrial activity, it is desired to solve problems relating to the wear and corrosion of highly stressed components by coating them with hard alloys so as to save raw material. Hard alloys based on cobalt and nickel have been used for decades with success particularly in the manufacture of machines, equipment and fittings.

In nuclear engineering the use of cobalt alloys, so-called stellites, is limited by the presence of cobalt. For this reason it has been attempted most recently to replace stellites by nickel-chromium-boron-silicon hard alloys, which can also be processed in a simpler manner. On the other hand, it has been found that boride- and silicide-containing hard nickel alloys are not satisfactory with respect to their resistance to corrosion, particularly intergranular corrosion. In many cases, nickel-chromium-boron-silicon alloys are unsatisfactory also in respect of high-temperature strength and susceptibility to cracking. For this reason, a new type of nickel-containing hard alloy has been developed and disclosed in corresponding application Ser. No 828,718, filed Aug. 29, 1977, entitled: "Nickel-Base Alloy", assigned to the assignee hereof, the disclosure of which is hereby incorporated specifically herein by reference.

In view of their characteristic content of hard material, these coating alloys are described as carbide-content of the alloy in adaptation to the relatively high chromium and tungsten contents and additions of boron, silicon and iron permit of a production of hard alloys having a hardness in the range of 35 to 50 to HRC and a high resistance to corrosion.

The new hard aloys have the structure which is typical of hard alloys. The hard material phases which are responsible for the wear resistance are embedded in a regular distribution in a relatively ductile metal matrix. In dependence on the alloy constituents and their mutual solubility in the solid state, the metal matrix consists of a solid solution of nickel, which contains chromium, tungsten, silicon, carbon and iron. The predominant hard material phase consists of a complex carbide of the type $M_7C_3$, wherein M stands for the metals chromium, nickel and tungsten. Owing to the extremely low solubility of boron in the matrix solid solution, another hard phase consists of chromium borides, mostly of the type CrB. Depending on the proportions of the alloying constituents within the stated tolerance ranges and the cooling conditions adopted in the production and processing of the alloy, additional hard phases may be stabilized in small quantities, if desired. They consist of the complex carbides of types $M_{23}C_6$ and $M_2C$ and a silicon-stabilized carbide of the type $M_6C$.

The new alloys afford advantages regarding the resistance to abrasion at higher temperatures because alloys having a comparatively smaller hardness at room temperature can be used so that the processing and machining will be facilitated.

In addition to its high strength at room temperature, the alloy distinguishes by an excellent strength at high temperature and an almost constant strength at temperatures in the range of 300° to 600° C.

As regards thermal expansion and density, the novel hard nickel alloys are comparable to corresponding conventional hard alloys based on nickel or cobalt.

In addition to their good mechanical properties, carbide-containing hard nickel alloys exhibit also a favorable melting behavior. The melting temperature range of about 1170° to 1230° C. is lower than that of comparable hard cobalt alloys. This results in excellent processing characteristics.

Owing to their excellent resistance to corrosion, the novel hard alloys close a gap which has existed in the conventional hard nickel alloys, which have an extremely poor resistance particularly to oxidizing media.

SUMMARY OF THE INVENTION

In an effort to further improve the mechanical and technological properties of the nickel-base alloy mentioned first hereinbefore, it has been found that the melting temperature range can be further lowered by an addition of phosphorus in an amount of 0.5 to 4.5 percent by weight, preferably 1 to 3 percent by weight, so that the processing characteristics are further improved. This is particularly seen in that the melting temperature range can be fairly well controlled by an addition of phosphorus in amounts in the stated range.

The phosphorus content also promotes the decomposition of the oxides on the surface to be coarsed. This improves the processing characteristics. The phosphorus content also avoids a mixing with the base material during welding so that the seam weld has a high purity and the danger of corrosion is eliminated.

An alloy of the following composition in percent by weight:

Carbon: 1.2
Chromium: 31.5
Silicon: 2.0

Boron: 0.6
Tungsten: 7.8
Iron: 2.0
Phosphorus: 2.0
Balance nickel has been proven to exhibit improved flow characteristics and improved ductility, i.e., greatly improved processing characteristics, when compared with the alloy according to the main patent, Ser. No. 828,718.

What is claimed is:

1. A nickel-base alloy which is resistant to corrosion, abrasion, erosion, cavitation and temperature cycles and possesses a high high-temperature strength, consisting essentially of the following composition in percent by weight:
   Carbon: 0.5 to 5
   Tungsten: 2 to 15
   Chromium: 25 to 55
   Boron: 0.5 to 3.5
   Phosphorus: 0.5 to 4.5
   Silicon: 1 to 5
   Iron: 1 to 5
   Nickel: balance and meets the following boundary conditions:
   (a) percent by weight $C =$ percent by weight $C_1 =$ percent by weight $C_2 + 0.2$;
   (b) percent by weight $W = 36 \times$ percent by weight $C_1$;
   (c) percent by weight $Cr \geq 17 + 9 \times$ percent by weight $C_2 - 4 \times$ percent by weight C.

2. A nickel-base alloy according to claim 1 characterized in that
   percent by weight $Cr \geq 25 + 9 \times$ percent by weight $C_2 - 4 \times$ percent by weight C.

3. A nickel-base alloy according to claim 1 having the following composition in percent by weight:
   Carbon: 0.5 to 3
   Tungsten: 7 to 10
   Chromium: 30 to 40
   Boron: 0.5 to 1.5
   Phosphorus: 1 to 3
   Silicon: 1 to 3
   Iron: 2 to 3
   Nickel: balance.

4. A nickel-base alloy according to claim 1 wherein the phosphorus content is 1 to 3 weight percent.

* * * * *